(12) United States Patent
Finck et al.

(10) Patent No.: US 9,359,072 B2
(45) Date of Patent: Jun. 7, 2016

(54) ROTOR BLADE FOR A ROTOR OF AN AIRCRAFT DESIGNED TO MINIMIZE NOISE EMITTED BY THE ROTOR

(71) Applicant: AIRBUS HELICOPTERS, Marignane (FR)

(72) Inventors: Sebastien Finck, Marseille (FR); Laurent Sudre, Pelissanne (FR)

(73) Assignee: Airbus Helicopters, Marignane (FR)

( * ) Notice: Subject to any disclaimer, the term of this patent is extended or adjusted under 35 U.S.C. 154(b) by 796 days.

(21) Appl. No.: 13/775,418

(22) Filed: Feb. 25, 2013

(65) Prior Publication Data

US 2013/0323043 A1 Dec. 5, 2013

(30) Foreign Application Priority Data

Feb. 27, 2012 (FR) ...................................... 12 00556

(51) Int. Cl.
*B64C 27/46* (2006.01)
*B64C 27/467* (2006.01)
*B64C 27/82* (2006.01)

(52) U.S. Cl.
CPC ................ *B64C 27/46* (2013.01); *B64C 27/467* (2013.01); *B64C 2027/8254* (2013.01)

(58) Field of Classification Search
CPC .................. B64C 27/46; B64C 27/467; B64C 2027/8254
USPC .......... 416/223 R, 228, 235, 236 R, 238, 243; 415/119, 211.2, 220, 223
See application file for complete search history.

(56) References Cited

U.S. PATENT DOCUMENTS 1,949,611 A * 3/1934 Martens .................. B64C 11/16
416/202
5,474,425 A * 12/1995 Lawlor .................... F03D 1/065
416/223 R (Continued)

FOREIGN PATENT DOCUMENTS

EP 2336022 A2 6/2011
FR 823433 A 1/1938

(Continued)

OTHER PUBLICATIONS

Chinese Office Action CN 20130057403.5 dated Jan. 28, 2015; 6 pages.

(Continued)

*Primary Examiner* — Justin Jonaitis
*Assistant Examiner* — Christopher Brunjes
(74) *Attorney, Agent, or Firm* — Brooks Kushman P.C.

(57) ABSTRACT

A blade (20) of a rotor (5), the blade (20) having a suction side (21) and a pressure side (22) extending transversely from a leading edge (23) towards a trailing edge (24) and extending spanwise from a root section (31) towards a free end section (41). The blade (40) comprises, going from the root section (31) towards said free end section (41): a root zone (30); followed by rounded zone (35); said rounded zone (35) presenting rounded pressure and suction sides (22", 21") departing from said main plane (P1) in a direction (Z) parallel to the axis of rotation (AXROT) of said blade.

13 Claims, 3 Drawing Sheets

(56) References Cited

U.S. PATENT DOCUMENTS

| | | |
|---|---|---|
| 5,566,907 A | 10/1996 | Marze |
| 5,619,797 A | 4/1997 | Barquet |
| 7,874,513 B1 | 1/2011 | Smith |
| 2007/0201982 A1* | 8/2007 | Neumeier ............. F04D 29/325 416/142 |
| 2010/0092294 A1* | 4/2010 | Brocklehurst .......... B64C 27/82 416/134 A |
| 2011/0147533 A1 | 6/2011 | Goossen |
| 2012/0195767 A1* | 8/2012 | Gervais .................. B64C 11/18 416/243 |

FOREIGN PATENT DOCUMENTS

| | | |
|---|---|---|
| FR | 1134736 A | 4/1957 |
| FR | 2719549 A1 | 11/1995 |
| FR | 2719552 A1 | 11/1995 |
| GB | 191500049 A | 1/1916 |

OTHER PUBLICATIONS

Search Report and Written Opinion; Application No. FR 1200556; dated Nov. 15, 2012.

* cited by examiner

ROTOR BLADE FOR A ROTOR OF AN AIRCRAFT DESIGNED TO MINIMIZE NOISE EMITTED BY THE ROTOR

CROSS REFERENCE TO RELATED APPLICATIONS

This application claims priority to French patent application No. FR 12 00556 filed on Feb. 27, 2012, the disclosure of which is incorporated in its entirety by reference herein.

BACKGROUND OF THE INVENTION (1) Field of the Invention

The present invention relates to a rotor blade, to a silent rotor, to an aircraft provided with such a rotor, and more particularly to a tail rotor for a helicopter. The invention also relates to a method of obtaining such a rotor blade.

The invention is thus situated in the narrow technical field of aircraft rotors.

(2) Description of Related Art

For example, a helicopter generally has a single main rotor driven mechanically by at least one engine, the main rotor providing the helicopter with lift and propulsion.

This type of helicopter is also provided with a tail rotor that performs an anti-torque function in order to compensate the torque created by the rotation of the main rotor, the tail rotor exerting a transverse thrust.

In addition, the tail rotor enables the pilot to control yaw and turning movements of the helicopter by exerting positive or negative transverse thrust.

A non-ducted tail rotor is known for performing this function and is referred to for convenience as a "conventional tail rotor". Conventionally, the non-ducted tail rotor is mounted on one side of the top end of a tail fin or at an end of a tail boom of the helicopter.

Such a non-ducted tail rotor is in widespread use. Nevertheless, it is also possible to use a ducted tail rotor, e.g. as known under the trademark Fenestron®.

A ducted tail rotor is then arranged in a duct provided in the bottom portion of the vertical tail fin of a helicopter, with the longitudinal axis of the duct being substantially perpendicular to the vertical plane of symmetry of the helicopter.

As a result, the streamlined structure of the vertical tail fin of the helicopter surrounds said duct and thus surrounds the tail rotor, which explains why such a tail rotor is said to be ducted. It should be observed that the streamlined structure is referred to by the person skilled in the art as a "fairing".

The streamlined structure then protects the ducted tail rotor against impacts created by elements external to the aircraft. It also increases safety for ground personnel by preventing such personnel being injured by the tail rotor in its duct.

The streamlined structure surrounding the duct in which the ducted tail rotor is arranged prevents noise from being transmitted forwards, downwards, and towards the rear of the rotorcraft, whereas a non-ducted tail rotor transmits noise in all directions.

Conventionally, a ducted rotor has a fairing that defines a duct. A rotor having a hub carrying a plurality of blades then rotates within the duct.

The hub is driven in rotation by a transmission gearbox fastened to the fairing by support bars that are arranged downstream from the rotor. These support bars may be shaped so as to constitute stationary vanes for guiding the stream of air downstream from the rotor. Under such circumstances, the assembly comprising these support bars is sometimes referred to an air stream "guide-stator".

The terms "upstream" and "downstream" are defined relative to the flow direction of air through the duct.

It can be understood that the term "ducted rotor" is used below to mean the assembly comprising in particular the fairing, the rotor as such, the gearbox, and the vanes located downstream from the blades.

The ducted rotor thus includes in particular the fairing and the elements present within the duct that is defined by the fairing.

Ducted rotors present advantageous functional characteristics.

Nevertheless, although the noise emitted by a ducted rotor is minimized, in particular in a forward direction, such a ducted rotor is still liable to generate noise.

The wake created by each blade of the ducted rotor can generate noise on impacting the vanes of the guide-stator.

In the state of the art, document FR 2 719 549 describing a ducted rotor is known. That ducted rotor has blades that are angularly distributed with irregular azimuth modulation determined by a sinusoidal relationship.

In addition, the vanes of the guide-stator are inclined so that they do not extend radially in order to minimize interaction of a blade with each vane.

Document FR 2 719 552 describes vanes for a guide-stator. According to that document, the tabs for fastening the root and/or the tip of a vane may be inclined or bent relative to a plane that extends in the span and chord directions of each vane.

Document FR 823 433 describes an aircraft having a non-ducted propeller and plano-convex type wings.

Document U.S. Pat. No. 7,874,513 describes a vertical takeoff and landing aircraft.

That aircraft has ducted rotors, each provided with a plurality of blades. The blades have leading and trailing edges that are C-shaped.

Document US 2007/201982 describes a ventilator and therefore does not lie in the technical field of the invention.

Furthermore, the wake generated by a rotor blade is liable to generate potentially troublesome noise, both in the context of a ducted rotor and also in the context of a non-ducted rotor.

For example, the Applicant has observed that the wake from a blade of a main rotor for providing a rotorcraft with lift can, surprisingly, impact against another blade of the same main rotor, in particular while the rotorcraft is moving in translation both forwards and downwards.

Independently of the nature of the rotor, the wake generated by a blade is therefore liable to give rise to sound annoyance, at least in certain situations.

The technological background also includes the following documents: FR 1 134 736; EP 2 336 022; U.S. Pat. No. 1,949,611; and GB 191500049 A, A.D. 1915 (Freeman Nat Harris).

Document FR 1 134 736 presents a blade having an undulating side edge.

BRIEF SUMMARY OF THE INVENTION

An object of the present invention is thus to propose a rotor blade serving at least to minimize the noise emitted by such a rotor, which noise is caused by the wake generated by the blade.

In the invention, a rotor blade has a suction side and a pressure side extending transversely from a leading edge towards a trailing edge and extending spanwise from a root section towards a free end section.

The term "span length" designates the shortest distance connecting the root section to the free end section.

Furthermore, it should be recalled that the term "span" is used conventionally to designate the maximum radial length of a rotor blade measured from the axis of rotation of the blade to the free end section of the blade.

It should also be recalled that a blade section is a cross-section of the blade relative to its span. This section is defined by an airfoil curve, sometimes also referred to as a "profile".

The blade is remarkable in particular in that it comprises spanwise from the root section towards the free end section: a root zone; and then a single rounded zone extending transversely from the leading edge towards the trailing edge; the root zone being contained in a main plane of rotation, the rounded zone presenting rounded pressure and suction sides from the leading edge towards the trailing edge that, starting from the root zone, depart from said main plane in a direction parallel to the axis of rotation of said blade, and opposite to the flow direction of a fluid through the blade until a point of maximum curvature is reached, and then come closer to the main plane.

The term "rounded zone" is used to mean a zone that is deformed to reach an extremum represented by a point of maximum curvature. The term "remote zone" may also be used for designating the rounded zone, this zone being spaced apart from the main plane, unlike the root zone.

All of the blade is then entirely rounded in such a rounded zone. The rounded zone is therefore very different from a blade having only a single undulating side edge, e.g. of the type described in document FR 1 134 736, and it serves to solve the technical problem posed.

When they move in rotation, the blades generate a turbulent wake.

In the context of a ducted rotor, the Applicant has found that aerodynamic interaction between such a turbulent wake of air coming from the blades and the bars holding the guide-stator to the fairing is liable to generate noise.

Under such circumstances, by deforming a blade and in particular by curving the suction and pressure sides of the blade in the rounded zone, it is possible to obtain an arched shape with the rounded zone presenting a saggita in a direction parallel to the axis of rotation of the rotor. This saggita is directed from the pressure side towards the suction side and therefore away from the guide-stator.

Thus, the rounded zone of the blade is spaced apart from the guide-stator and more particularly from its support bars, with the pressure side of the rounded zone of the blade being concave facing the guide-stator.

The greater spacing of the rounded zone from the guide-stator as compared with a conventional blade thus serves to minimize the interaction that occurs between the turbulent wake generated by a blade and the guide-stator.

Furthermore, in addition to increasing the distance the turbulent wake needs to travel between the rounded zone and the support bars, it should be observed that the rounded shape in the rounded zone accentuates dissipation in the turbulent wake.

It can thus be understood that the rotating blade generates a turbulent wake that disappears more quickly than the wake of a conventional blade, the turbulent wake also traveling a greater distance before reaching the guide-stator in comparison with a conventional blade.

As a result, the blade serves to avoid contact between a guide-stator and a turbulent wake generated by the rotating blade, or if the wake does reach the guide-stator, it enables the turbulent wake that reaches it to be minimized.

Likewise, with a non-ducted rotor such as a rotorcraft lift rotor, the rapid dissipation of the wake generated by a blade of the invention minimizes interaction between the wake and another blade of the rotor while flying forwards and downwards. It is possible that the wake of one blade cannot impact against another blade.

It should be observed that by curving only the rounded zone of a blade relative to a known blade, it is possible to obtain a rotor blade that is acoustically advantageous, both for a ducted rotor and for a non-ducted rotor.

In addition, by leaving the root zone unaffected, existing conditions for fastening such a blade on a hub are less unaffected.

Likewise, it is possible to conserve interface conditions with the fairing in a ducted rotor by not modifying the position of the end section relative to its position in a conventional blade. By taking no action on the free end section of the blade, the known effect of the blade being entrained towards the fairing of a ducted rotor, sometimes known as the "aerodynamic suction effect", is maintained.

Consequently, it is possible to obtain a blade of the invention starting from a conventional blade by moving its rounded zone away in a direction that is parallel to the axis of rotation of said blade so as to improve the acoustic performance of a rotor, while leaving unmodified both the interface conditions with a rotor hub and also with the fairing, if the rotor is a ducted rotor.

The blade may also include one or more of the following additional characteristics, e.g. in order to make it more effective.

For example, in a variant, the rounded zone may come close to the main plane without reaching it.

This maximizes the number of blade sections that are spaced apart from the main plane, in particular for the purpose of minimizing the noise of interaction between a blade and a vane or between a blade and another blade.

In a preferred variant, the rounded zone, starting from the root zone, departs from said main plane and then moves closer thereto, and the blade presents, starting from said plane, an end zone that follows on from the rounded zone, the end zone including said free end section.

The root zone and the end zone may be arranged in the main plane in order to optimize the performance of the rotor, in particular for a ducted rotor.

The root zone and the end zone are then plane.

It should be observed that the end zone may comprise solely the free end section, or it may extend spanwise from the rounded zone towards the free end section.

The end zone may also present an angle relative to the main plane.

In another aspect, the root zone extends radially spanwise from said root section towards a first intermediate section common to the root zone and to the rounded zone. The first intermediate section is optionally arranged radially between the root section and a middle section of the blade situated at equal distances from the root section and from the free end section.

Likewise, where appropriate, the end zone extends radially spanwise from a second intermediate section common to the end zone and to the rounded zone towards said free end section. The second intermediate section is optionally arranged radially between the free end section and a middle section of the blade situated at equal distances from the root section and from the free end section.

It can be understood that the positions of the first and second intermediate sections may be determined in such a manner as to maximize the span of the rounded zone, while conserving a root zone that is sufficient to avoid disturbing the fastening with a hub, and where appropriate while conserving a free end zone that is sufficient to avoid harming the suction effect.

In another aspect, the blade presents a plurality of sections distributed spanwise along a stacking line of the blade, and the root portion of the stacking line situated in the root zone and the end portion of the stacking line situated in the end zone may be arranged in said main plane. The intermediate portion of the stacking line that is situated in the rounded zone is then curved to depart from said main plane in a direction parallel to the axis of rotation of said blade.

It should be observed that it is possible to define a geometrical construction line known as a "stacking line" on which all of the sections of the blade are stacked.

The manufacturer thus arbitrarily defines a characteristic point for each section of the blade, with each characteristic point of a section then occupying the same position relative to the intersection between that section and the stacking line. Each section may then possibly be oriented relative to the stacking line in application of a twisting relationship.

For example, the manufacturer may decide that the leading edge of each section is to be at a predetermined distance from the stacking line, which predetermined distance may be equal to one-third of the chord of the section, for example. The final shape of the blade is then obtained by implementing a twisting relationship for angularly orienting each section relative to a twisting line.

Under such circumstances, the intermediate portion of the stacking line is rounded in order to cause the rounded zone to be spaced apart from the main plane, and possibly also from a guide-stator.

For example, a projection of the intermediate portion onto an orthogonal plane may have the shape of a cubic spline function, the orthogonal plane being perpendicular to the main plane and containing a pitch variation axis of the blade.

Furthermore, projections of the root portion and of the end portion onto said orthogonal plane optionally coincide with a projection of the pitch variation axis of the blade onto that orthogonal plane.

Furthermore, the intermediate portion of the stacking line may depart from the root portion in order to reach a point of maximum curvature and then come closer to the main plane. The point of maximum curvature optionally lies in a secondary plane upstream from said main plane and parallel to the main plane.

Optionally, a projection of the point of maximum curvature onto the orthogonal plane is situated at a radial distance from the root section that lies in the range one-fourth of the span length of the blade between its root section and its free end section to three-fourths of said span length.

In another aspect the point of maximum curvature is situated at a vertical distance from the main plane, and the vertical distance lies in the range one-third of a reference chord to three times the reference chord.

The point of maximum curvature is contained in a maximum section of the blade, and the reference chord may be the chord of the maximum section.

In addition to a blade, the invention also provides a rotor having such a blade.

According to the invention, a rotor is provided with a rotary hub carrying a plurality of blades.

Each blade is a blade in accordance with the invention, i.e. it is of the type described above. Thus, each blade comprises suction and pressure sides extending transversely from a leading edge towards a trailing edge and extending spanwise from a root section towards a free end section, and the blade includes, going from the root section towards the free end section, a root zone followed by a rounded zone, the root zone being contained in a main plane of rotation, the rounded zone having rounded pressure and suction sides that, starting from the root zone, depart from the main plane in a direction parallel to the axis of rotation of the blade and opposite to a flow direction of a fluid through the rotor, as far as a point of maximum curvature, and then comes closer to the main plane.

Optionally, the rotor has a fairing defining a duct in which the blades move, the rotor including a guide-stator situated downstream from the blades, the rounded zone departing from the main plane so as to place the point of maximum curvature farther away from the guide-stator.

The invention also provides an aircraft including such a rotor.

Furthermore, the invention also provides a method of minimizing the noise emitted by a rotor, the rotor comprising a rotary hub carrying a plurality of blades.

Each blade comprises suction and pressure sides extending transversely from a leading edge towards a trailing edge and extending spanwise from a root section towards a free end section, and the blade includes, going from the root section towards the free end section a root zone followed by a rounded zone, the root zone being contained in a main plane of rotation, according to the method, a pressure side and a suction side of the rounded zone are curved in a direction parallel to the axis of rotation of said blade and opposite to a flow direction of the fluid through the rotor in order to place said rounded zone farther from the main plane, or indeed from a guide-stator, if any, in order to minimize the noise emitted by the rotor.

Optionally, each zone presents a plurality of sections distributed spanwise along a stacking line, a root portion of the stacking line being situated in the root zone being arranged in the main plane, an intermediate portion of the stacking line being situated in the rounded zone being curved, and said intermediate portion is made with the help of a cubic spline function formed by using at least three control points, a first control point being common to the root portion and to the intermediate portion.

Care may be taken to avoid tangential discontinuities in the intermediate portion, since such discontinuities can generate turbulence.

Thus, when an even number of control points is used, these points may be arranged symmetrically around a maximum plane containing a point of maximum curvature.

When an odd number of control points is used, one control point may be placed on the point of maximum curvature that is to be reached, and then the other control points can be arranged symmetrically about a maximum plane containing the point of maximum curvature.

In particular, control points may be placed close to the first control point and to an extreme second control point in order to smooth the curvature of the intermediate portion of the stacking line as much as possible at its junction with the root portion.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which.

Elements present in more than one of the figures are given the same references in each of them.

DETAILED DESCRIPTION OF THE INVENTION

Figure 1:
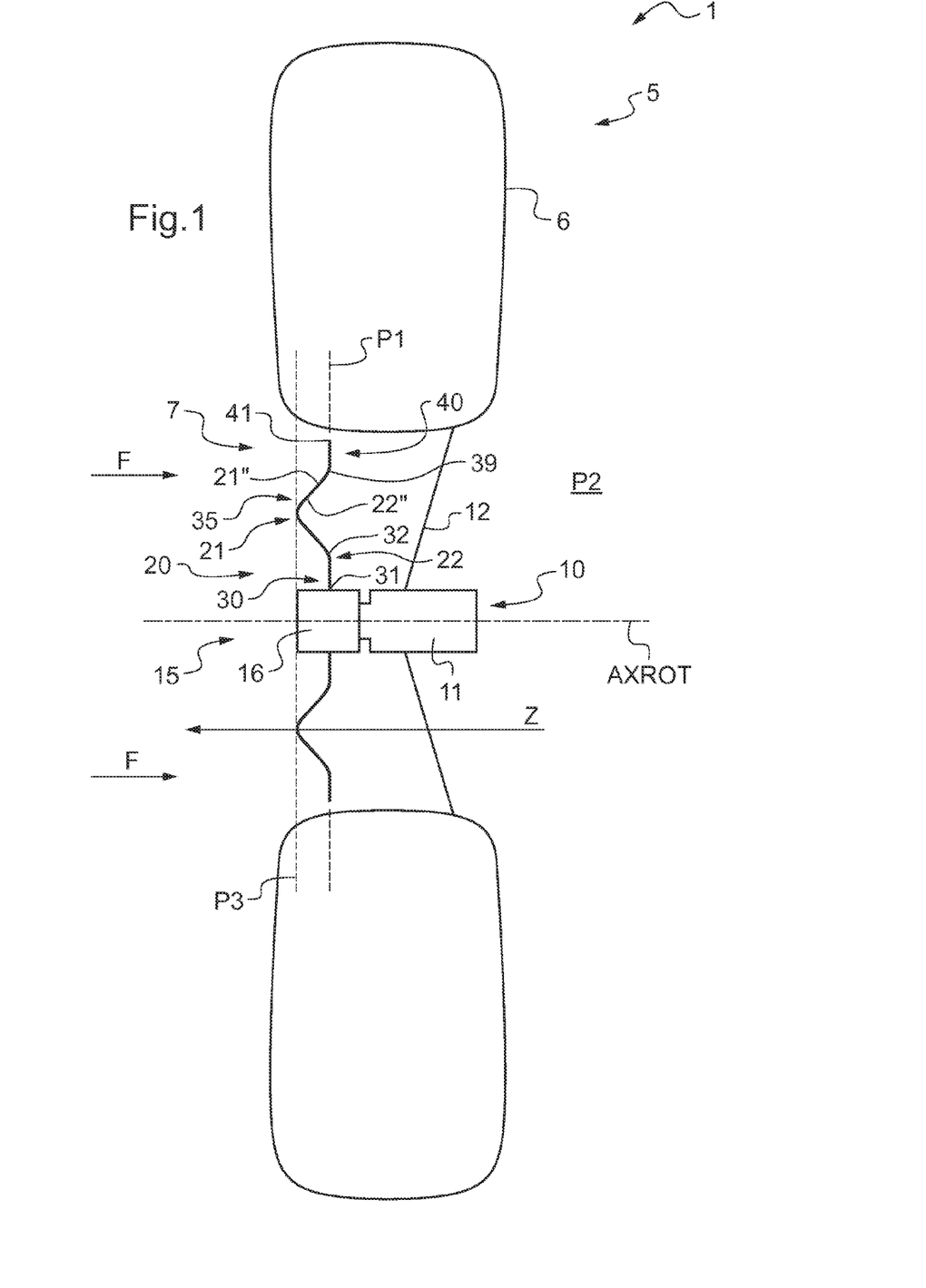
FIG. 1 is a diagrammatic view of an aircraft.

FIG. 1 shows an aircraft 1 having a ducted rotor 5. In particular, the ducted rotor may be a Fenestron®. It should be observed that the rotor 5 could also be a non-ducted rotor, such as a main rotor for providing the aircraft 1 with lift.

Elements of the aircraft that do not belong to the rotor are not shown in order to avoid overloading FIG. 1 pointlessly.

The ducted rotor 5 thus has a fairing 6 defining a duct 7. A rotary assembly 15 having a hub 16 carrying a plurality of blades 20 is thus arranged in the duct 7.

Furthermore, the ducted rotor 5 has a guide-stator 10 arranged in the duct downstream from the rotary assembly 15 in the flow direction F of the stream of air through the ducted rotor 5.

Such a guide-stator may include both a power gearbox 11 for driving the rotary assembly 15 in rotation about an axis of rotation AXROT, and also support bars 12 for fastening the gearbox 11 to the fairing. These support bars 12 are generally profiled to guide the stream of air passing through the ducted rotor downstream from the rotary assembly 15, these support bars 12 sometimes being referred to as "vanes" by the person skilled in the art.

Furthermore, independently of the nature of the rotor 5, the blades 20 of the rotor extend spanwise from the hub 16, starting from a root section 31 facing the hub 16 and extending to a free end section 41. In a ducted rotor, the free end section 41 thus faces the fairing 6.

In addition, the blades 20 extend in elevation from a pressure side 22 towards a suction side 21 and transversely from a leading edge towards a trailing edge.

In the method of the invention, these two distinct zones are identified for each blade.

Consequently, each blade extends spanwise from the hub 16 towards the free end section 41 by passing via a zone referred to as a "root zone" 30 containing the root section 31, followed by a zone referred to as the "rounded zone" 35, or indeed the "deformed zone".

Under such circumstances, either the rounded zone 35 contains the free end section 41, or else the rounded zone 35 is extended by a zone referred to as the "end zone" 40 that includes the free end section 41.

With such a configuration, in order to minimize the noise emitted by the rotor in operation, i.e. while the blades are performing rotary motion about the axis of rotation, the pressure side 22" and the suction side 21" of the rounded zone 35 are curved in a direction Z parallel to the axis of rotation of said blade and in a direction opposite to the flow direction F of air through the rotor.

Thus, the rounded zone 35 departs from the main plane P1, and possibly also from said guide-stator in order to reach a secondary plane P3.

As a general rule, prior art blades move in rotation about an axis of rotation AXROT in a plane referred to as the "main plane" P1. This main plane P1 is thus sometimes also referred to as the "plane of rotation" of the blades 20.

Conversely, in the invention, a rounded zone is deformed to depart from the main plane P1, and from the guide-stator 10 in the example shown, in order to minimize the noise emitted by the rotor.

The rounded zone thus reaches a point of maximum curvature situated in the secondary plane P3.

Starting the secondary plane P3, the rounded zone approaches the main plane P1.

Figure 7:
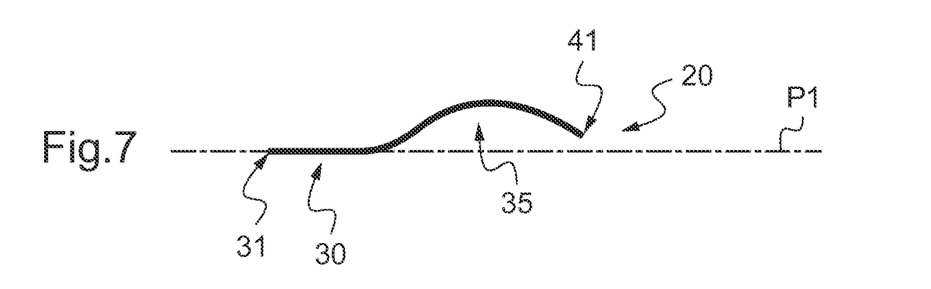

In the variant of FIG. 7, this rounded zone does not reach the main plane P1. The rounded zone then includes the free end section 41 that is located upstream from the main plane P1.

This variant appears to be more suitable for a non-ducted rotor.

Otherwise, in other variants, the rounded zone 35 leads to an end zone 40 located in the main plane P1.

Figure 6:
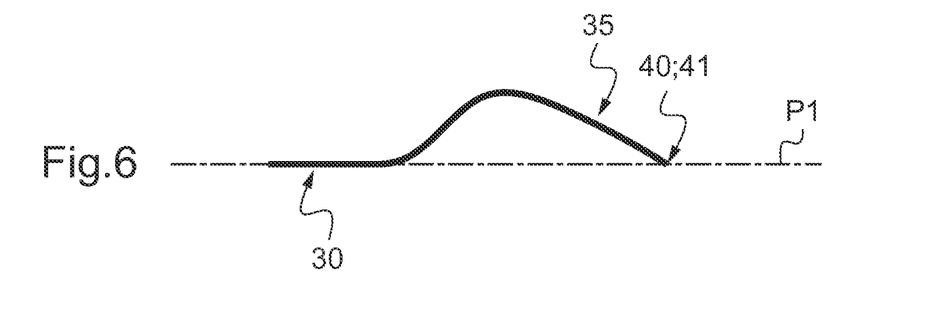

In the embodiment of FIG. 6, the rounded zone decreases linearly to the main plane P1.

In this variant, the end zone 40 is limited at the free end section 41.

This variant appears to be suitable for a ducted rotor.

Figure 5:
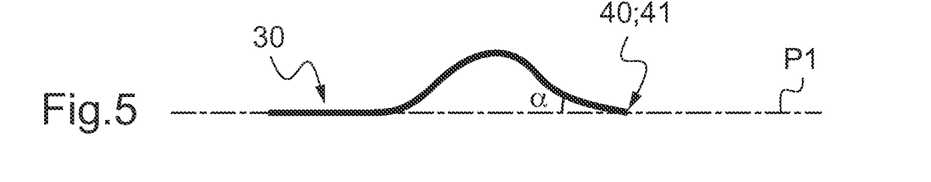

The same applies to the variant of FIG. 5, which differs from the variant of FIG. 6 in that the curved zone decreases in non-linear manner going to the main plane P1.

In other variants, the end zone 40 may extend spanwise.

Figure 4:
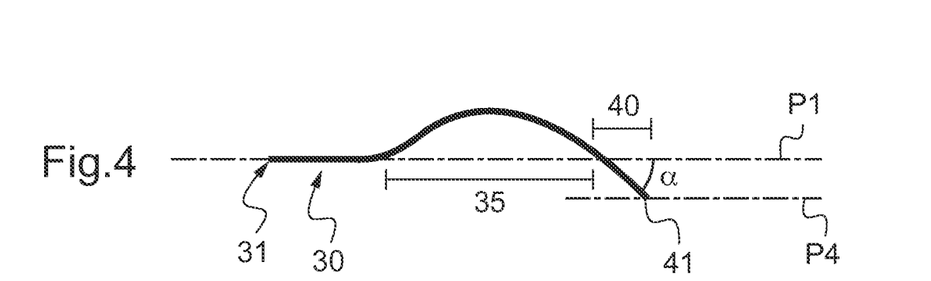
FIGS. 4 to 7 are views showing variants of the invention.

In the variant of FIG. 4, the end zone 40 presents an angle α relative to the main plane.

The free end section 41 then reaches a fourth plane P4 downstream from the main plane. Under such circumstances, this variant appears to be better adapted to a non-ducted rotor.

Finally, in the preferred example of FIG. 1, the end zone 40 may be contained in the main plane P1.

Each blade 20 then moves in rotation in a ring defined by the main plane P1 and the secondary plane P3.

It can be understood that it is possible to avoid deforming the root zone 30 so as to avoid modifying interface conditions with the hub, and to avoid deforming the end zone 40 so as not to degrade the aerodynamic suction effect that occurs between the fairing 6 and the blade 20.

Figure 2:
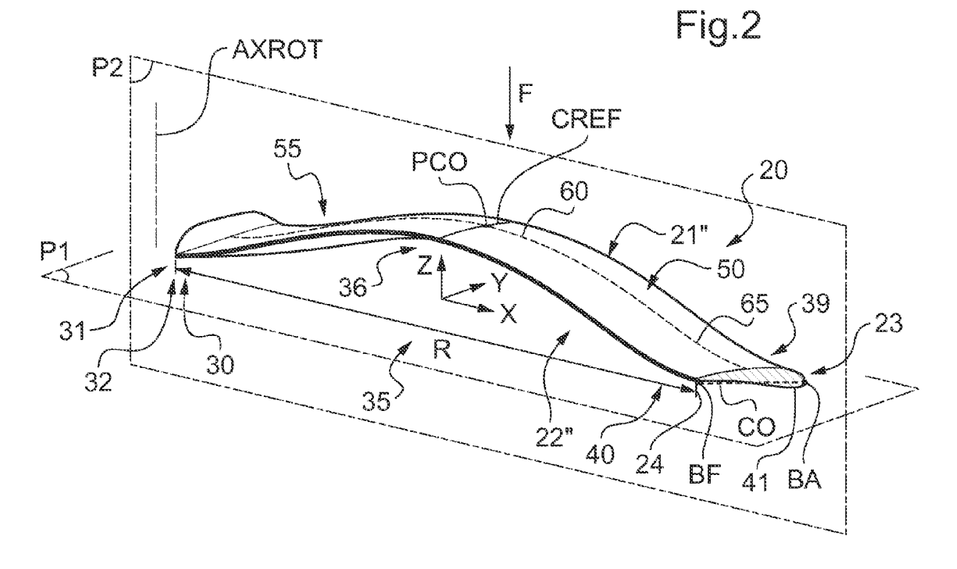
FIG. 2 is a three-dimensional view of a blade.

FIG. 2 shows such a blade 20 implementing this method.

The blade 20 shown thus extends spanwise from a root section 31 towards a free end section 41, with the span length R corresponding to the distance between the root section 31 and the free end section 41.

It should be observed that a spar (not shown) may project from the root section in order to be secured to a hub 16.

Furthermore, the blade extends transversely from a leading edge 23 towards a trailing edge 24.

It should be recalled that the chord of a section corresponds to the distance between the leading edge to the trailing edge of this section. FIG. 2 shows the chord CO of the free end section 41 that extends between the leading edge BA and the trailing edge BF of this free end section 41.

In addition, the blade 20 extends in elevation in its thickness direction from a pressure side 22 to a suction side 21. It can be understood that each of the suction side and pressure side extend transversely from the leading edge 23 of the blade 20 towards the trailing edge 24.

In order to minimize interactions between the blades 20 and the support bars 12 in a ducted rotor, the blade 20 includes, going from the root section 31 towards said free end section 41, a root zone 30 followed by a rounded zone 35, and possibly an end zone 40. The root zone 30 and the end zone 40 are thus contained in a main plane P1 of rotation in the preferred variant, as shown.

In contrast, the rounded zone 35 presents a pressure side 22" and a suction side 21" that are rounded so as to depart from the main plane P1 in a direction Z parallel to the axis of rotation AXROT of the blade.

It should also be observed that the root zone 30 extends radially spanwise from the root section 31 towards a first intermediate section 32. Similarly, the rounded zone 35 extends radially spanwise from the first intermediate section 32 towards a second intermediate section 39, the end zone 40 extending radially spanwise from the second intermediate section 39 towards the free end section 41.

Depending on the variant, the second intermediate section 39 and the free end section 41 may coincide, and may possibly be arranged in the main plane P1.

In order to minimize the noise emitted by a rotor including the blade 20, it is possible to maximize the rounded zone to the detriment of the root zone, and possibly also of the end zone. Nevertheless, it can be understood that these root and end zones are dimensioned so as to guarantee interfacing of the blade on a hub, and where applicable the suction effect of the blade interacting with a fairing.

For example, the first intermediate section 32 is then arranged radially between the root section 31 and a middle section 37 of the blade situated at equal distances from the root section 31 and the from the free end section 41.

Conversely, the second intermediate section 39 may extend radially between the middle section 37 and the free end section 41.

In another aspect, in order to define the shape of the blade 20, it should be recalled that a manufacturer can define a construction line referred to as the "stacking line" 50. The manufacturer then positions each section of the blade 20 relative to the stacking line 50.

For example, the manufacturer may specify that the leading edge of each section is to be situated at a predetermined distance from the stacking line, this distance possibly varying depending on the spanwise locations of the sections.

The final shape of the blade is then obtained by implementing a relationship for twisting the sections.

Under such circumstances, the stacking line 50 of the blade 20 being described comprises in succession a root portion 55 situated in the root zone 30, an intermediate portion 60 situated in the rounded zone 35, and then, where applicable, an end portion 65 situated in the end zone 40.

Consequently, the root portion 55 and the end portion 65 are optionally located in the main plane P1. In contrast, the intermediate portion 60 is rounded to depart from the main plane P1 in a direction parallel to the axis of rotation of the blade.

More precisely, the intermediate portion 60 departs from the main plane P1 starting from the root section in order to reach a point of maximum curvature PCO situated in the secondary plane P3. Going from the point of maximum curvature PCO, the intermediate portion 60 comes closer to the main plane P1 possibly in order to reach the end portion 65.

It should be observed that the point of maximum curvature PCO is situated in a section referred to as the "maximum section" 36, this maximum section representing the section of the blade 20 that is furthest from the main plane in a direction Z parallel to the axis of rotation AXROT. This maximum section 36 may coincide with the middle section 37.

Figure 3:
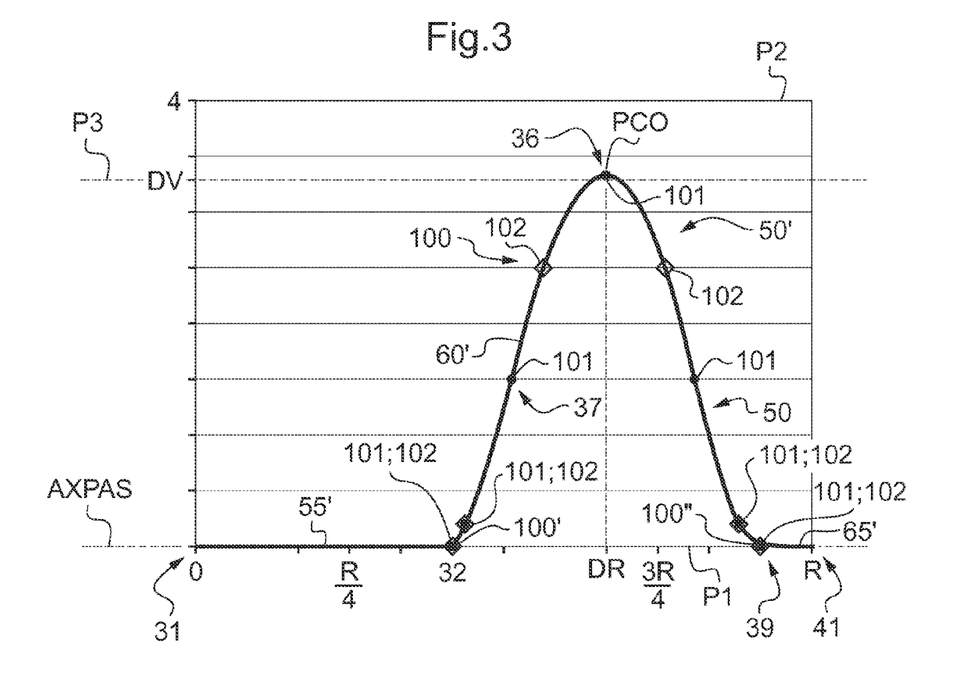
FIG. 3 is a projection of a stacking line onto an orthogonal plane.

FIG. 3 shows the projection 50' of a stacking line 50 onto a plane referred to as the "orthogonal plane" P2. This orthogonal plane P2 is perpendicular to the main plane P1 and contains for example the axis AXPAS for varying the pitch angle of the blade 20.

Under such circumstances, an orthogonal projection 55' of the root portion 55 and an orthogonal projection 65' of the end portion 65 onto an orthogonal plane P2 may possibly coincide with the pitch variation axis AXPAS of the blade in the orthogonal plane.

In contrast, an orthogonal projection 60' of the intermediate portion 60 onto the orthogonal plane P2 is preferably in the shape of a cubic spline function.

In order to define this cubic spline function during a design stage, the manufacturer may make use of at least three control points 100.

In particular, the manufacturer may select first and second control points 100', 100" respectively common to the root portion and to the intermediate portion, and also to the end portion and to the intermediate portion.

In addition, when an even number of control points 102 is used, it is possible to distribute these control points 102 symmetrically about the maximum plane 36 passing via a point of maximum curvature PCO.

When an odd number of control points 101 is used, it is possible to place one control point 101 on the point of maximum curvature that is to be reached, and then to distribute the other control points 101 symmetrically about the midplane 36.

Furthermore, it is possible to define the spanwise position of the point of maximum curvature with the help of a projection of the point of maximum curvature PCO onto the orthogonal plane, this projection being referred to as the "maximum projection" for convenience.

Thus, the maximum projection PCO' of the point of maximum curvature PCO onto the orthogonal plane P2 is situated at a radial distance DR from the root section 31 that lies in the range one-fourth R/4 of the span length R of the blade to three-fourths 3R/4 of said span length R.

Furthermore, it may be observed that the point of maximum curvature PCO is situated at a vertical distance DV from the main plane P1. This vertical distance DV may optionally lie between one-third of a reference chord CREF and three times the reference chord CREF. The reference chord may be the chord of the maximum section 36.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A blade of a rotor, the blade having a suction side and a pressure side extending transversely from a leading edge towards a trailing edge and extending spanwise from a root section towards a free end section, wherein the blade comprises spanwise from the root section towards the free end section: a root zone; and then a single rounded zone extending transversely from the leading edge towards the trailing edge; the root zone being contained in a main plane of rotation (P1), the rounded zone presenting rounded pressure and suction sides from the leading edge towards the trailing edge that, starting from the root zone, depart from the main plane (P1) in a direction (Z) parallel to the axis of rotation (AXROT) of the blade, and opposite to the flow direction of a fluid through the blade until a point of maximum curvature (PCO) is reached, and then come closer to the main plane (P1);

wherein the point of maximum curvature (PCO) lies in a secondary plane (P3) upstream from the main plane (P1) and parallel with the main plane (P1); and wherein a projection (PCO') of the point of maximum curvature (PCO) onto an orthogonal plane (P2) is situated at a radial distance (DR) from the root section that lies in the range one-fourth of the span (R) of the blade between the root section and the free end section and three-fourths of the span (R), the orthogonal plane (P2) being perpendicular to the main plane (P1) and containing a pitch variation axis (AXPAS) of the blade;

wherein the rounded zone, starting from the root zone, departs from the main plane (P1) and then moves closer thereto, and the blade presents, starting from the main plane (P1), an end zone that follows on from the rounded zone, the end zone including the free end section;

wherein the blade presents a plurality of sections distributed spanwise along a stacking line of the blade, and a root portion of the stacking line situated in the root zone and an end portion of the stacking line situated in the end zone are arranged in the main plane (P1), with an intermediate portion of the stacking line that is situated in the rounded zone being curved to depart from the main plane (P1) in a direction parallel to the axis of rotation of the blade;

wherein projections of the root portion and of the end portion onto an orthogonal plane (P2) coincide with a pitch variation axis (AXPAS) of the blade in the orthogonal plane, the orthogonal plane (P2) being perpendicular to the main plane (P1) and containing a pitch variation axis (AXPAS) of the blade; and wherein the projections of the root portion and the end portion extend spanwise to coincide with the pitch variation axis such that the stacking line coincides with the pitch variation axis for the root portion and the end portion.

2. A blade according to claim 1, wherein the root zone and the end zone are arranged in the main plane (P1).

3. A blade according to claim 1, wherein a projection of the intermediate portion onto an orthogonal plane (P2) has the shape of a cubic spline function, the orthogonal plane (P2) being perpendicular to the main plane (P1) and containing a pitch variation axis (AXPAS) of the blade.

4. The blade according to claim 3, the cubic spline function is formed by using at least three control points, a first control point being common to the root portion and to the intermediate portion.

5. A blade according to claim 1, wherein the point of maximum curvature (PCO) is situated at a vertical distance (DV) from the main plane (P1), with the vertical distance (DV) lying in the range one-third of a reference chord (CREF) to three times the reference chord (CREF).

6. A blade according to claim 5, wherein the point of maximum curvature (PCO) is contained in a maximum section of the blade, and the reference chord is the chord of the maximum section.

7. A blade according to claim 1, wherein the root zone extends radially spanwise from the root section towards a first intermediate section common to the root zone and to the rounded zone, the first intermediate section being arranged radially between the root section and a middle section of the blade situated at equal distances from the root section and from the free end section.

8. A blade according to claim 1, wherein the end zone extends radially spanwise from a second intermediate section common to the end zone and to the rounded zone towards the free end section, the second intermediate section being arranged radially between the free end section and a middle section of the blade situated at equal distances from the root section and from the free end section.

9. A rotor having a rotary hub carrying a plurality of blades, wherein each blade is a blade according to claim 1.

10. A rotor according to claim 9, wherein the rotor has a fairing defining a duct in which the blades move, the rotor including a guide-stator situated downstream from the blades, the rounded zone departing from the main plane (P1) so as to place the point of maximum curvature farther away from the guide-stator.

11. An aircraft, including a rotor according to claim 9.

12. The blade according to claim 1, wherein the rounded zone decreases linearly towards the free end section between the point of maximum curvature (PCO) and the main plane (P1).

13. The blade according to claim 1, wherein the stacking line only deviates from the pitch variation axis for the single rounded zone.

* * * * *